(12) United States Patent
Tighe et al.

(10) Patent No.: US 12,524,022 B2
(45) Date of Patent: *Jan. 13, 2026

(54) MULTICOPTER WITH ANGLED ROTORS

(71) Applicant: Wisk Aero LLC, Mountain View, CA (US)

(72) Inventors: James Joseph Tighe, San Jose, CA (US); Eric Allison, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,685

(22) Filed: Feb. 20, 2024

(65) Prior Publication Data

US 2024/0190563 A1 Jun. 13, 2024

Related U.S. Application Data

(63) Continuation of application No. 17/744,145, filed on May 13, 2022, now Pat. No. 11,932,384, which is a continuation of application No. 16/444,303, filed on Jun. 18, 2019, now Pat. No. 11,358,712, which is a continuation of application No. 15/297,030, filed on Oct. 18, 2016, now Pat. No. 10,364,024.

(51) Int. Cl.
*G05D 1/652* (2024.01)
*B64C 29/00* (2006.01)
*B64D 27/31* (2024.01)

(52) U.S. Cl.
CPC ......... *G05D 1/652* (2024.01); *B64C 29/0025* (2013.01); *B64D 27/31* (2024.01)

(58) Field of Classification Search
CPC . B64C 27/26; B64C 29/0016; B64C 29/0025; B64C 29/0033
See application file for complete search history.

(56) References Cited

U.S. PATENT DOCUMENTS

| | | | |
|---|---|---|---|
| 1,627,856 | A | 5/1927 | MacVicar |
| 2,987,272 | A | 6/1961 | Vogt |
| 3,089,666 | A | 5/1963 | Quenzler |
| 3,149,800 | A | 9/1964 | Sintes et al. |

(Continued)

FOREIGN PATENT DOCUMENTS

| | | |
|---|---|---|
| CN | 202244078 U | 5/2012 |
| CN | 102874406 A | 1/2013 |

(Continued)

OTHER PUBLICATIONS

EP23216810.4, "Extended European Search Report", Feb. 9, 2024, 7 pages.

(Continued)

*Primary Examiner* — Joseph W Sanderson
(74) *Attorney, Agent, or Firm* — Kilpatrick Townsend & Stockton LLP

(57) ABSTRACT

A multicopter with angled rotors includes a fuselage and a plurality of rotors. At least some of the rotors are disposed on opposite sides of the fuselage and each is oriented at a corresponding angle to a substantially horizontal plane of the aircraft, the angle being of a magnitude such that a plane of rotation of the rotor does not intersect at least a critical portion of the fuselage.

17 Claims, 5 Drawing Sheets

(56) References Cited

U.S. PATENT DOCUMENTS

| | | | |
|---|---|---|---|
| 3,181,810 | A | 5/1965 | Olson |
| 3,409,248 | A | 11/1968 | Bryan |
| 3,627,234 | A | 12/1971 | Dziallas |
| 4,979,698 | A | 12/1990 | Lederman |
| 6,719,244 | B1 | 4/2004 | Gress |
| 8,393,564 | B2 | 3/2013 | Kroo |
| 8,485,464 | B2 | 7/2013 | Kroo |
| 8,690,096 | B2 | 4/2014 | Alvarez |
| 8,733,690 | B2 | 5/2014 | Bevirt et al. |
| 8,931,729 | B2 | 1/2015 | Abde Qader Alzu'bi et al. |
| 9,120,560 | B1 | 9/2015 | Armer et al. |
| 9,764,833 | B1 | 9/2017 | Tighe et al. |
| 9,944,386 | B1 | 4/2018 | Reichert et al. |
| 10,029,785 | B2 | 7/2018 | Niedzballa |
| 10,053,213 | B1 | 8/2018 | Tu |
| 10,086,931 | B2 | 10/2018 | Reichert et al. |
| 10,364,024 | B2 | 7/2019 | Tighe et al. |
| 10,364,036 | B2 | 7/2019 | Tighe et al. |
| 11,358,712 | B2 | 6/2022 | Tighe et al. |
| 11,358,713 | B2 | 6/2022 | Tighe et al. |
| 11,485,488 | B1 | 11/2022 | Armer et al. |
| 11,932,384 | B2 * | 3/2024 | Tighe ............... B64D 27/31 |
| 11,945,576 | B2 * | 4/2024 | Tighe ............... B64D 27/24 |
| 2003/0094537 | A1 | 5/2003 | Austen-Brown |
| 2004/0107013 | A1 | 6/2004 | Fuller et al. |
| 2009/0084890 | A1 | 4/2009 | Reinhardt |
| 2010/0124865 | A1 | 5/2010 | Van et al. |
| 2011/0031355 | A1 | 2/2011 | Alvarez |
| 2012/0012692 | A1 | 1/2012 | Kroo |
| 2012/0261523 | A1 | 10/2012 | Shaw |
| 2013/0020429 | A1 | 1/2013 | Kroo |
| 2013/0092799 | A1 | 4/2013 | Tian et al. |
| 2013/0126680 | A1 | 5/2013 | Hamke et al. |
| 2016/0059958 | A1 | 3/2016 | Kvitnevskiy |
| 2016/0167776 | A1 | 6/2016 | Shaw |
| 2016/0236774 | A1 | 8/2016 | Niedzballa |
| 2016/0236775 | A1 | 8/2016 | Eshkenazy et al. |
| 2016/0244158 | A1 | 8/2016 | Fredericks et al. |
| 2016/0297520 | A1 | 10/2016 | Sada-Salinas et al. |
| 2016/0347447 | A1 | 12/2016 | Judas et al. |
| 2017/0225779 | A1 | 8/2017 | Gamble |
| 2017/0300065 | A1 | 10/2017 | Douglas et al. |
| 2018/0105267 | A1 | 4/2018 | Tighe et al. |
| 2018/0105268 | A1 | 4/2018 | Tighe et al. |
| 2018/0105279 | A1 | 4/2018 | Tighe et al. |
| 2019/0127056 | A1 | 5/2019 | Weekes et al. |
| 2019/0322364 | A1 | 10/2019 | Tighe et al. |
| 2019/0322378 | A1 | 10/2019 | Tighe et al. |
| 2021/0107620 | A1 | 4/2021 | Weekes et al. |
| 2021/0245873 | A1 | 8/2021 | Tighe et al. |
| 2021/0362849 | A1 | 11/2021 | Bower et al. |
| 2023/0025665 | A1 | 1/2023 | Tighe et al. |
| 2023/0103521 | A1 | 4/2023 | Bower et al. |

FOREIGN PATENT DOCUMENTS

| | | | |
|---|---|---|---|
| CN | 103796917 | A | 5/2014 |
| CN | 105539834 | A | 5/2016 |
| CN | 105882953 | A | 8/2016 |
| EP | 3098161 | A1 | 11/2016 |
| EP | 3251882 | B1 | 4/2019 |
| JP | 2010075568 | A | 4/2010 |
| JP | 5997342 | B1 | 9/2016 |
| WO | 2013098736 | A2 | 7/2013 |
| WO | 2015099375 | A1 | 7/2015 |

OTHER PUBLICATIONS

CN202210735081.4, "Office Action", Jan. 25, 2025, 13 pages.
"35MW/11MWH ESS Project in Western Australia", Kokam by SolarEdge, 16 pages.
"Archer Aviation Inc's Invalidity Contentions", Case No. 3:21-CV-02450-WHO, Oct. 11, 2021, 42 pages.
"Battery Charger MULTI XS 25000, XS 25000 Multi Xt 14000, XT 14000", CTEK, Available Online at: https://docs.rs-online.com/15d2/0900766b81335f57.pdf, Feb. 27, 2020, 8 pages.
"Li-Ion BMS Cell-Board Processor", Lithiumate EL01, 2011, 14 pages.
"Li-Ion BMS Controller Processor", Lithiumate EL02, 2011, 9 pages.
"Lithium Ion Battery Monitoring System", Analog Devices AD7280A, 2011, 48 pages.
"Lithium Power BMS Manual", GTBMS005A-MC8, Harbin Guantuo Power Equipment Co., Ltd., Jul. 22, 2009, 12 pages.
"Owner's Guide : RXV Elite Freedom", EZGO: A Textron Company, 2017, 60 pages.
"Pipistrel Alpha Electro Information Pack", Pipisrel, Revision 05, Oct. 2017, pp. 1-23.
"Strings, Parallel Cells, and Parallel Strings", OrionBMS, Available Online at: https://www.orionbms.com/manuals/pdf/parallel_strings.pdf, pp. 1-17.
"This Week@ NASA", NASA TV, Jun. 17, 2016, 2 pages.
"U-Changer XP Rev 2 User Manual", Valence—Advanced Energy Systems, Document Version 4.8, Nov. 2011, 61 pages.
"Vahana, the Self-Piloted, eVTOL Aircraft from A3 by Airbus, Successfully Completes First FullScale Test Flight", Airbus, Feb. 2, 2018, 3 pages.
"WattsUP, the New 2-Seat Electric Trainer", Pipistrel Aircraft—News, Available Online at: http://www.pipistrel.si/news/wattsup-the-new-2seat-electric-trainer-took, 2 pages.
"XTI Aircraft Tri Fan 600", Electric VTOL News, 11 pages.
"XTI TriFan 665 Flies!", The Electric VTOL News, May 8, 2019, 8 pages.
U.S. Appl. No. 15/297,030, "Non-Final Office Action", Nov. 15, 2018, 15 pages.
U.S. Appl. No. 15/297,030, "Notice of Allowance", Apr. 12, 2019, 7 pages.
U.S. Appl. No. 15/297,035, "Non-Final Office Action", Nov. 23, 2018, 16 pages.
U.S. Appl. No. 15/297,035, "Notice of Allowance", Apr. 8, 2019, 7 pages.
U.S. Appl. No. 16/444,303, "Non-Final Office Action", Dec. 10, 2021, 9 pages.
U.S. Appl. No. 16/444,303, "Notice of Allowance", Apr. 4, 2022, 8 pages.
U.S. Appl. No. 16/444,449, "Non-Final Office Action", Dec. 24, 2021, 10 pages.
U.S. Appl. No. 16/444,449, "Notice of Allowance", Apr. 13, 2022, 7 pages.
U.S. Appl. No. 17/744,145, "Non-Final Office Action", Aug. 2, 2023, 15 pages.
U.S. Appl. No. 17/744,145, "Notice of Allowance", Nov. 20, 2023, 7 pages.
U.S. Appl. No. 17/744,469, "Non-Final Office Action", Aug. 16, 2023, 11 pages.
U.S. Appl. No. 17/744,469, "Notice of Allowance", Nov. 28, 2023, 9 pages.
Andrea, "Battery Management Systems for Large Lithium-Ion Battery Packs", Artech House, 2010, 303 pages.
AU2017346502, "First Examination Report", Jan. 24, 2020, 3 pages.
AU2017346502, "Notice of Acceptance", Jan. 15, 2021, 3 pages.
AU2017346502, "Second Examination Report", May 14, 2020, 3 pages.
AU2017346502, "Third Examination Report", Sep. 4, 2020, 5 pages.
AU2021202178, "First Examination Report", Jul. 14, 2022, 5 pages.
AU2021202178, "Notice of Acceptance", May 25, 2023, 3 pages.
Bertorelli, "Airbus Announces Electric Aircraft", Avweb, Apr. 26, 2014, 1 page.
Bodson et al., "Control Allocation with Load Balancing", American Institute of Aeronautics and Astronautics, Aug. 10-13, 2009, pp. 1-13.

(56) References Cited

OTHER PUBLICATIONS

Bordignon, "Constrained Control Allocation for Systems with Redundant Control Effectors", Virginia Polytechnic Institute and State University ProQuest Dissertations Publishing, Dec. 19, 1996, 260 pages.
Chin et al., "Battery Evaluation Profiles for X-57 and Future Urban Electric Aircraft", American Institute of Aeronautics and Astronautics/ Institute of Electrical and Electronics Engineers Electric Aircraft Technologies Symposium, Aug. 26-28, 2020, pp. 1-12.
Chin et al., "Battery Performance Modeling on Maxwell X-57", American Institute of Aeronautics and Astronautics, 2019, pp. 1-15.
Clarke et al., "X-57 Power and Command System Design", Institute of Electrical and Electronics Engineers Transportation Electrification Conference and Expo, Jun. 22-24, 2017, 8 pages.
CN201780063710.0, "Notice of Decision to Grant", Apr. 14, 2022, 4 pages.
CN201780063710.0, "Office Action", Nov. 1, 2021, 12 pages.
Cobb, "Four-Seat Sun Flyer in the Works", The Aircraft Owners and Pilots Association, Jul. 23, 2017, 3 pages.
EP17862880.6, "Extended European Search Report", May 18, 2020, 7 pages.
EP17862880.6, "Intention to Grant", Sep. 12, 2023, 9 pages.
EP17862880.6, "Office Action", Apr. 28, 2021, 4 pages.
EP17862880.6, "Office Action", Jun. 14, 2022, 4 pages.
Grady, "Pipistrel Introduces Alpha Electro", Apr. 14, 2015, 1 page.
Harkegard, "Efficient Active Set Algorithms for Solving Constrained Least Squares Problems in Aircraft Control Allocation", Proceedings of the 41st Institute of Electrical and Electronics Engineers Conference on Decision and Control, May 6, 2002, 25 pages.
Huber, "Electric Sun Flyer Plans Fall First Flight", Available Online at: https://www.ainonline.com/aviation-news/general-aviation/2017-07-26/electric-sun-flyer-plans-fall-first-flight, Jul. 26, 2017, 2 pages.
Johansen et al., "Control Allocation—A Survey", Department of Engineering Cybernetics, Nov. 2, 2012, 22 pages.
Merheb et al., "Active Fault Tolerant Control of Octorotor UAV Using Dynamic Control Allocation", The 2014 International Conference on Intelligent Unmanned Systems, Sep. 2014, 6 pages.
Moore, "The Joby S2 VTOL Concept : Exploring the New Degrees of Design Freedom of Distrusted Electric Propulsion", Vertifile, Nov.-Dec. 2014, pp. 22-24.
Niles, "Pipistrel Flies WATTsUP Electric Trainer", AVweb, Aug. 24, 2014, 1 page.
NZ752614, "First Examination Report", Sep. 30, 2019, 5 pages.
NZ752614, "Notice of Allowance", Jul. 27, 2020, 1 page.
Oppenheimer et al., "Control Allocation", Chapter 8, Archer-NDCA-00172099, pp. 8-1-8-24.
PCT/US2017/056817, "International Preliminary Report on Patentability", May 2, 2019, 9 pages.
PCT/US2017/056817, "International Search Report and Written Opinion", Dec. 22, 2017, 10 pages.
PCT/US2017/056819, "International Preliminary Report on Patentability", May 2, 2019, 8 pages.
PCT/US2017/056819, "International Search Report and Written Opinion", Dec. 22, 2017, 9 pages.
Rapoport, "Airbus Pivots Electric Aircraft Plans", Archer-NDCA-00171664, Apr. 1, 2017, 1 page.
Stoll et al., "Conceptual Design of the Joby S2 Electric VTOL PAV", Aviation Technology, Integration, and Operations Conference, Jun. 16-20, 2014, pp. 1-6.
Szondy, "E-Fan Electric Aircraft makes First Public Flight", Archer-NDCA-00171660, Apr. 30, 2014, 4 pages.
Yoney, "Pipistrel Taurus Electro G2 takes to the Skies, Goes on Sale", Archer-NDCA-00171840, Feb. 25, 2011, 5 pages.
Zhou et al., "Reconfigurable Control Allocation Technology Using Weighted Least Squares for Nonlinear System in Unmanned Aerial Vehicle", Session: IS-4: Intelligent Adaptation and Model Identification, Jun. 25, 2012, pp. 1-11.
AU2023226684, "First Examination Report", Sep. 27, 2024, 6 pages.
AU2023226684, "Second Examination Report", Mar. 24, 2025, 3 pages.
Application No. CN202210735081.4, Office Action, Mailed On Oct. 11, 2025, 11 pages.

* cited by examiner

MULTICOPTER WITH ANGLED ROTORS

CROSS REFERENCE TO OTHER APPLICATIONS

This application is a continuation of U.S. patent application Ser. No. 17/744,145, entitled MULTICOPTER WITH ANGLED ROTORS filed May 13, 2022, which is a continuation of U.S. patent application Ser. No. 16/444,303, entitled MULTICOPTER WITH ANGLED ROTORS filed Jun. 18, 2019, now U.S. Pat. No. 11,358,712, issued Jun. 14, 2022, which is a continuation of U.S. patent application Ser. No. 15/297,030, entitled MULTICOPTER WITH ANGLED ROTORS filed Oct. 18, 2016, now U.S. Pat. No. 10,364,024, issued Jul. 30, 2019, the disclosures of which are incorporated herein by reference for all purposes.

BACKGROUND OF THE INVENTION

Multicopter aircraft typically include a plurality of horizontally oriented rotors, sometimes referred to as "lift fans," to provide lift, stability, and control. A flight control system, sometimes referred to as a "flight controller" or "flight computer", may be provided to translate pilot or other operator input, and/or corrections computed by an onboard computer, e.g., based on sensor data, into forces and moments and/or to further translate such forces and moments into a set of actuator (e.g., lift rotors; propellers; control surfaces, such as ailerons; etc.) and/or associated parameters (e.g., lift fan power, speed, or torque) to provide the required forces and moments.

For example, pilot or other operator inputs may indicate a desired change in the aircraft's speed, direction, and/or orientation, and/or wind or other forces may act on the aircraft, requiring the lift fans and/or other actuators to be used to maintain a desired aircraft attitude (roll/pitch/yaw), speed, and/or altitude.

An aircraft typically is considered to have six degrees of freedom of movement, including forces in the forward/back, side/side, and up/down directions (e.g., Fx, Fy, and Fz) and moments about the longitudinal (roll) axis, the transverse (pitch) axis, and the vertical (yaw) axis (e.g., Mx, My, and Mz). If an aircraft has more actuators than degrees of freedom, it must be determined how the various actuators will be used to act on the aircraft in response to commands received via manual and/or automated controls. For a given set of one or more pilot commands under given circumstances, some combinations of actuators capable of acting on the aircraft to achieve the result indicated by the pilot command(s) may be more effective and/or efficient than others. For example, some may consume more or less power and/or fuel than others, provide a more smooth transition from a current state than others, etc.

Rotors may spin at a high rate and could pose a risk to an occupant of a manned multicopter and/or to equipment housed in a fuselage or other structure comprising the multicopter.

BRIEF DESCRIPTION OF THE DRAWINGS

Various embodiments of the invention are disclosed in the following detailed description and the accompanying drawings.

DETAILED DESCRIPTION

Figure 1:
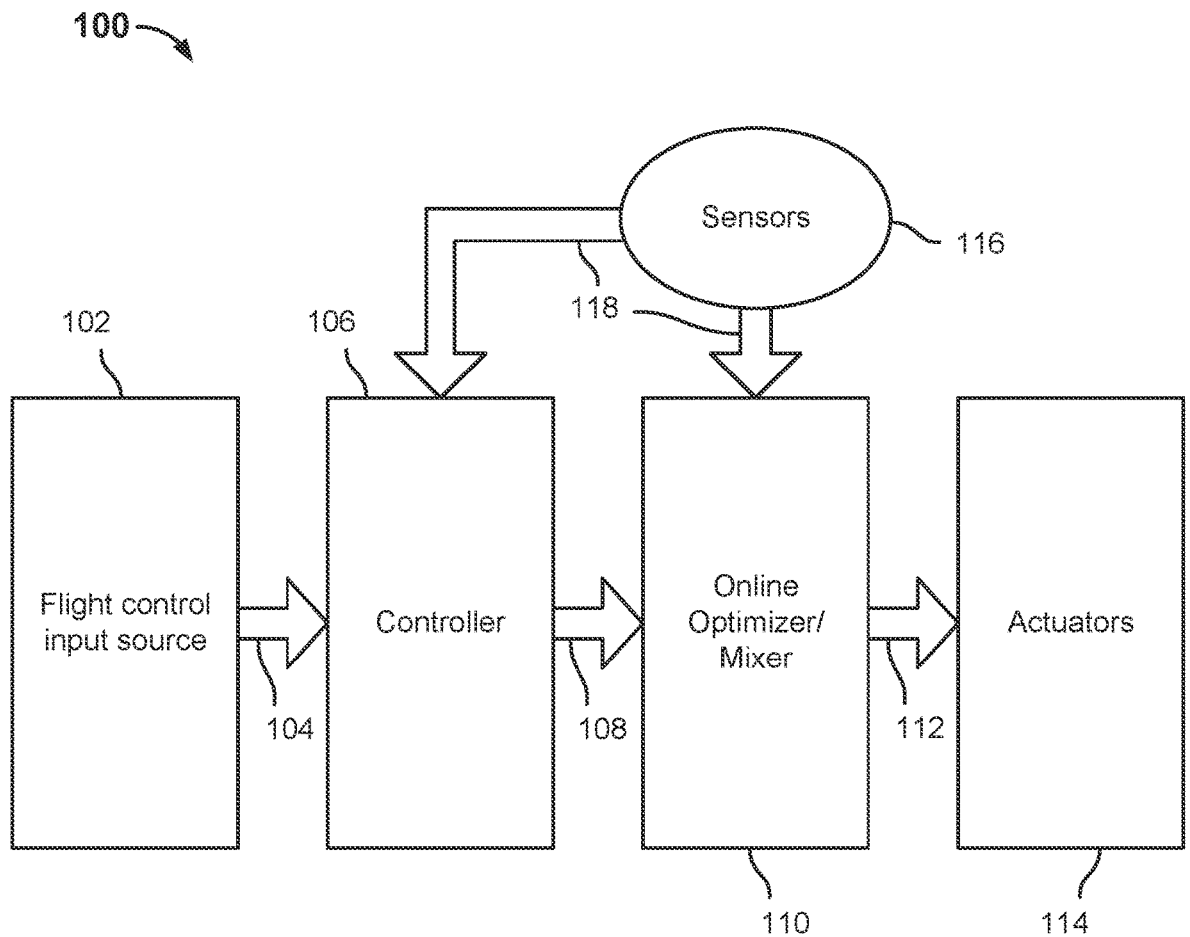
FIG. 1 is a block diagram illustrating an embodiment of a flight control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multicopter aircraft with angled rotors is disclosed. In various embodiments, a multicopter aircraft as disclosed herein includes a plurality of lift fans or other rotors disposed in a configuration around a fuselage and/or other centrally-located structure of the aircraft. In some embodiments, a first subset of the rotors may be disposed on a one side of the aircraft and a second subset of the rotors may be disposed on an opposite side of the aircraft. In various embodiments, each of at least a subset of the rotors is mounted at a corresponding non-zero angle off of a horizontal plane of the aircraft. In some embodiments, the angle at which each rotor is mounted is determined at least in part by a location of the rotor relative to the fuselage and/or a human or other occupied portion thereof, the angle being determined at least in part to ensure that a plane in which the rotor primarily rotates does not intersect the fuselage and/or a human or other occupied portion thereof. In various embodiments, the respective angles at which at least a subset of the rotors are mounted may be determined at least in part to provide the ability to generate lateral force components in the horizontal plane of the aircraft at rotor mount locations that are offset in the horizontal plane from a center of gravity of the aircraft, so as to provide an ability to use the rotors to control yaw of the aircraft (i.e., rotation about a vertical axis of the aircraft) by applying moments about the vertical axis.

FIG. 1 is a block diagram illustrating an embodiment of a flight control system. In the example shown, flight control system 100 includes a source of flight control inputs 102 configured to provide flight control inputs 104 to a controller 106, e.g., a flight control computer. In some embodiments, source of inputs 102 may comprises one or both of pilot input, e.g., via manual flight controls, and auto-pilot or other self-piloting technologies. For example, in a self-piloting aircraft inputs 104 may be generated by a self-piloting program/computer 102. In various embodiments, source of inputs 102 may include manual input devices (sometimes referred to as "inceptors"), such as stick, throttle, rudder, collective, joystick, thumb stick, and/or other manual control/input devices configured to be manipulated by a pilot or other operator to control the flight of an aircraft. Such inceptor devices and/or associated electronics, and/or a self-piloting program, computer, or module, may be configured to provide as input signals 104 one or more of a roll direction, roll rate, yaw direction, yaw rate, pitch angle, pitch rate, altitude, altitude rate and/or forward or other thrust input signal. In the example shown, controller 106 also receives sensor data 118, e.g., wind speed, air temperature, etc., from sensors 116. Flight controller 106 translates, aggregates, and/or otherwise processes and/or interprets the received flight control inputs 104 and/or sensor data 118 to generate and provide as output associated forces and/or moments 108 to be applied to the aircraft via its control assets (e.g., propellers, rotors, lift fans, aerodynamic control surfaces, etc.; sometimes referred to herein as "actuators") to maneuver the aircraft in a manner determined based at least in part on the flight control inputs 104 and/or sensor data 118. In various embodiments, forces/moments 108 may include forces and/or moments along and/or about one or more axes of the aircraft, such as x, y, and z axes, corresponding to longitudinal, transverse, and vertical axes of the aircraft, respectively, in various embodiments.

Referring further to FIG. 1, the flight control system 100 includes an online optimizer/mixer 110 configured to receive forces/moments 108. Online optimizer/mixer 110 receives as input forces/moments 108 and computes dynamically (online) a set of actuators and associated commands/parameters 112 to achieve the requested forces/moments 108. In some embodiments, the optimizer minimizes total power given a desired combination of forces and moments. Actuators 114 are configured to operate in response to actuator commands/parameters 112 provided by online optimizer/mixer 110.

In the example shown, sensors 116 provide sensor data 118 to online optimizer/mixer 110. Examples of sensors 116 and/or sensor data 118 may include one or more of airspeed, temperature, or other environmental conditions; actuator availability, failure, and/or health information; aircraft attitude, altitude, and/or other position information; presence/absence of other aircraft, debris, or other obstacles in the vicinity of the aircraft; actuator position information; etc. In various embodiments, online optimizer/mixer 110 may be configured to take sensor data 118 into account in determining an optimal mix of actuators and associated parameters to achieve a requested set of forces and moments. For example, in some embodiments, six or more lift fans may be provided to lift an aircraft into the air, enable the aircraft to hover, control aircraft attitude relative to the horizontal, etc. In some embodiments, failure of a lift fan may be reflected in sensor data 118, resulting in a seamless response by online optimizer/mixer 110, which provides an optimal set of actuators and parameters 112 that omits (does not rely on) the failed lift fan. Likewise, in some embodiments, sensor data reflecting diminished power/performance, overheating, etc., may be taken into consideration, such as by adjusting a mapping of actuator parameter to expected effect on the aircraft for affected actuators.

Figure 2A:
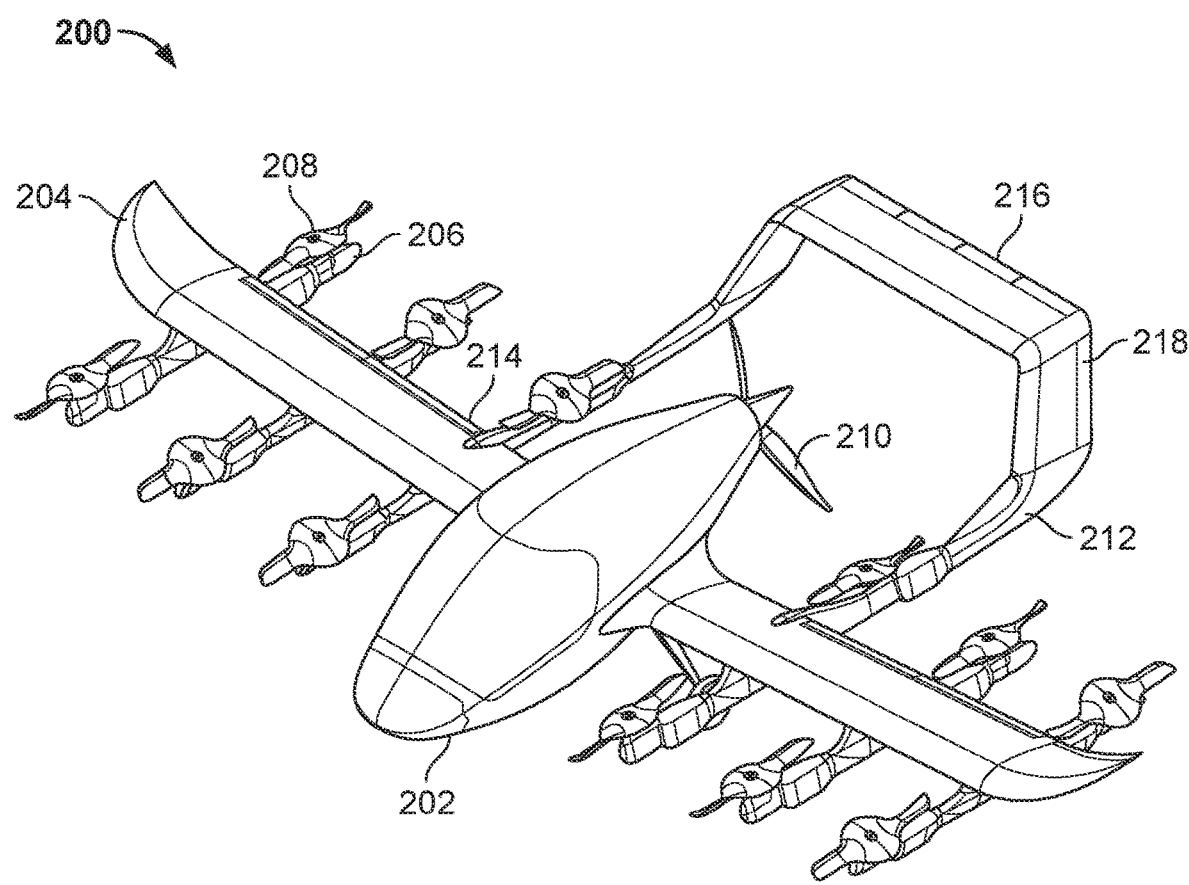
FIG. 2A is a block diagram illustrating an embodiment of a multicopter aircraft with angled rotors.

FIG. 2A is a block diagram illustrating an embodiment of a multicopter aircraft with angled rotors. In various embodiments, a flight control system such as flight control system 100 of FIG. 1 may be embodied in an aircraft such as aircraft 200 of FIG. 2A. In the example shown, aircraft 200 includes a fuselage (body) 202 and wings 204. A set of three underwing booms 206 is provided under each wing. Each boom 206 has two lift fans 208 mounted thereon, one forward of the wing and one aft. Each lift fan 208 may be driven by an associated drive mechanism, such as a dedicated electric motor. One or more batteries (not shown) and/or onboard power generators (e.g., small gas turbine) may be used to drive the lift fans 208 and/or charge/recharge onboard batteries.

In various embodiments, each boom 206 is positioned at an angle relative to a vertical axis of the aircraft such that the lift fans 208 are mounted thereon at an associated angle, as described more fully in connection with FIGS. 2B-2E.

In the example shown in FIG. 2A, a propeller 210 is mounted on the fuselage 202 and configured to push the aircraft through the air in the forward (e.g., x axis) direction. The propeller 210 is positioned between a pair of tail booms 212 that extend aft and are joined at their aft end by a tail structure on which aerodynamic control surfaces including elevators 216 and rudder 218 are mounted. In various embodiments, each of the inboard booms 206 forms at least in part an integral part of the corresponding port/starboard side tail boom 212. In some embodiments, the tail booms 212 comprise extensions aft from the respective inboard booms 206. For example, the tail booms 212 may be formed as part of or fastened (e.g., bolted) to an aft end of the corresponding inboard boom 206. Additional control surfaces include ailerons 214 mounted on the trailing edge of wings 204.

In the example shown, four ailerons 214 are included, e.g., to provide redundancy. In some embodiments, if a single aileron 214 is lost or fails the remaining three ailerons 214 are sufficient to control the aircraft. Likewise, in some embodiments, loss of one rudder 218 results in one remaining rudder to provide a degree of yaw control, along with the lift fans. Finally, in some embodiments four elevators 216 are provided for loss/failure tolerance.

Figure 2B:
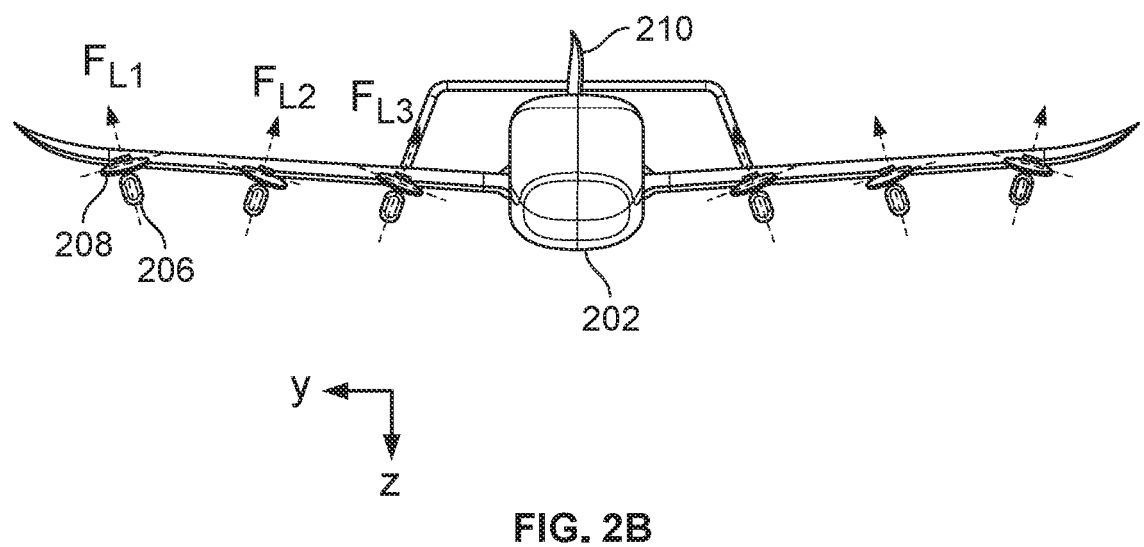
FIG. 2B is a block diagram showing a front view of the multicopter aircraft 200 of FIG. 2A.

In some embodiments, an aircraft 200 as shown in FIG. 2A may have the following approximate dimensions:
Wingspan: 36.0 feet
Nose to tail 21.4 feet
Centerline to first boom 6.1 feet
Distance between inner booms 12.2 feet
Spacing between booms (same wing) 4.0 feet
Push propeller sweep 6.5 feet
Lift fan sweep 4.2 feet
Distance between fan centers (same boom) 8.7 feet FIG. 2B is a block diagram showing a front view of the multicopter aircraft 200 of FIG. 2A. Coordinate axes in the z (vertical) and y (side) direction are indicated. The front view shown in FIG. 2B illustrates the respective angles off the vertical axis (z axis as labeled), sometimes referred to herein as "cant angles", at which the outboard, middle, and inboard pairs of lift fans 206 are oriented. In various embodiments, angling the lift fans, as indicated, may provide additional options to control the aircraft, especially at or near hover. For example, different combinations of fans may be used to exercise yaw control (e.g., rotate around z axis), to slip sideways or counteract the force of wind while in a hover (y axis), etc.

In various embodiments, the respective angles at which lift fans 208 may be oriented may be determined based at least in part on safety considerations, such as to increase the likelihood that debris thrown centrifugally from a lift fan, e.g., should the lift fan break apart, would be propelled on a trajectory and/or in a plane that does not intersect a human-occupied portion of fuselage 202. In some embodiments, two side by side seats are provided for passengers in a forward part of fuselage 202. Batteries to power the lift fans 208 and/or push propeller 210 may be located in a central/over wing part of the fuselage 202, and in some embodiments both the human-occupied and battery occupied parts of the fuselage are protected at least in part by canting the booms/lift fans as disclosed herein.

In some embodiments, lift fan cant angles may be determined at least in part via a constrained optimization design process. The fan cants (e.g., roll and pitch fan angles) may be determined by an optimization process in which an object is to minimize the amount of torque required by any individual motor for a variety of trimmed or equilibrium conditions including: angular accelerations, any individual fan failure, crosswinds, and center of gravity variations. In some embodiments, the optimization is subject to constraints of preventing the plane of the fan blade from intersecting the crew in the event of catastrophic failure of a fan. Another example of a constraint that may be applied is ensuring that the fans are aligned to the local flow angle for forward flight with the fans stopped and aligned with the boom.

In various embodiments, the effective forces and moments capable of being provided by each respective lift fan may be stored onboard the aircraft 200 in a memory or other data storage device associated with the onboard flight control system. In various embodiments, a matrix, table, database, or other data structure may be used.

In some embodiments, effectiveness under different operating conditions may be stored. For example, effectiveness of a lift fan or control surface may be different depending on conditions such as airspeed, temperature, etc. In some embodiments, forces and moments expected to be generated by a lift fan or other actuator under given conditions may be discounted or otherwise reduced, e.g., by a factor determined based at least in part on an environmental or other variable, such as a measure of lift fan motor health.

In an aircraft having angled lift fans as in the example shown in FIG. 2B, the forces and moments capable of being generated by a given lift fan may reflect the angle at which each lift fan is mounted. For example, lift fans mounted at an angle relative to the horizontal plane of the aircraft would generate a horizontal force component and a vertical force component, and each force may generate a corresponding moment about one or more axes of the aircraft, depending on the location at which the fan is mounted relative to the center of gravity of the aircraft.

Figure 2C:
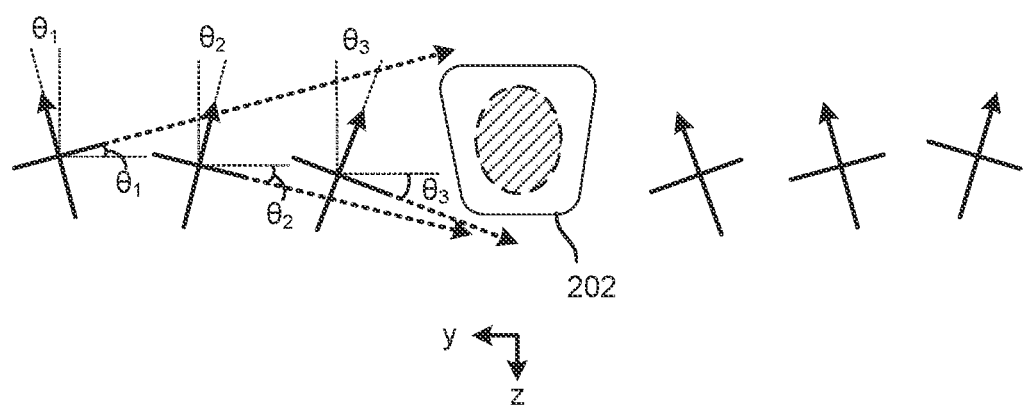
FIG. 2C is a block diagram illustrating an example of angled rotors as implemented in an embodiment of a multicopter aircraft with angled rotors.

FIG. 2C is a block diagram illustrating an example of angled rotors as implemented in an embodiment of a multicopter aircraft with angled rotors. In the example shown, the approximate angles at which the left side (as viewed from the front) rotors of the aircraft 200 as shown in FIGS. 2A and 2B are mounted are shown. In particular, the left most (outboard) lift fan is shown to be mounted at an angle $\theta 1$ to the vertical (and, therefore, horizontal/lateral) axis of the aircraft, tilting away from fuselage 202, resulting in a plane of rotation of the lift fan, indicated by the dashed arrow extending away from the lift fan, not intersecting the fuselage 202. In some embodiments, the plane of rotation may intersect the fuselage but not a human-occupied or otherwise critical portion thereof.

Similarly, in the example shown the middle lift fan and the inboard lift fan have been angled in towards the fuselage 202, resulting in their respective planes of rotation being rotated downward by corresponding angles, such that they do not intersect the fuselage 202.

In various embodiments, angling lift fans or other rotors towards or away from a fuselage or critical portion thereof, and/or other critical structures, may decrease the risk that debris thrown centrifugally from the rotor would hit the fuselage or other structure.

Figure 2D:
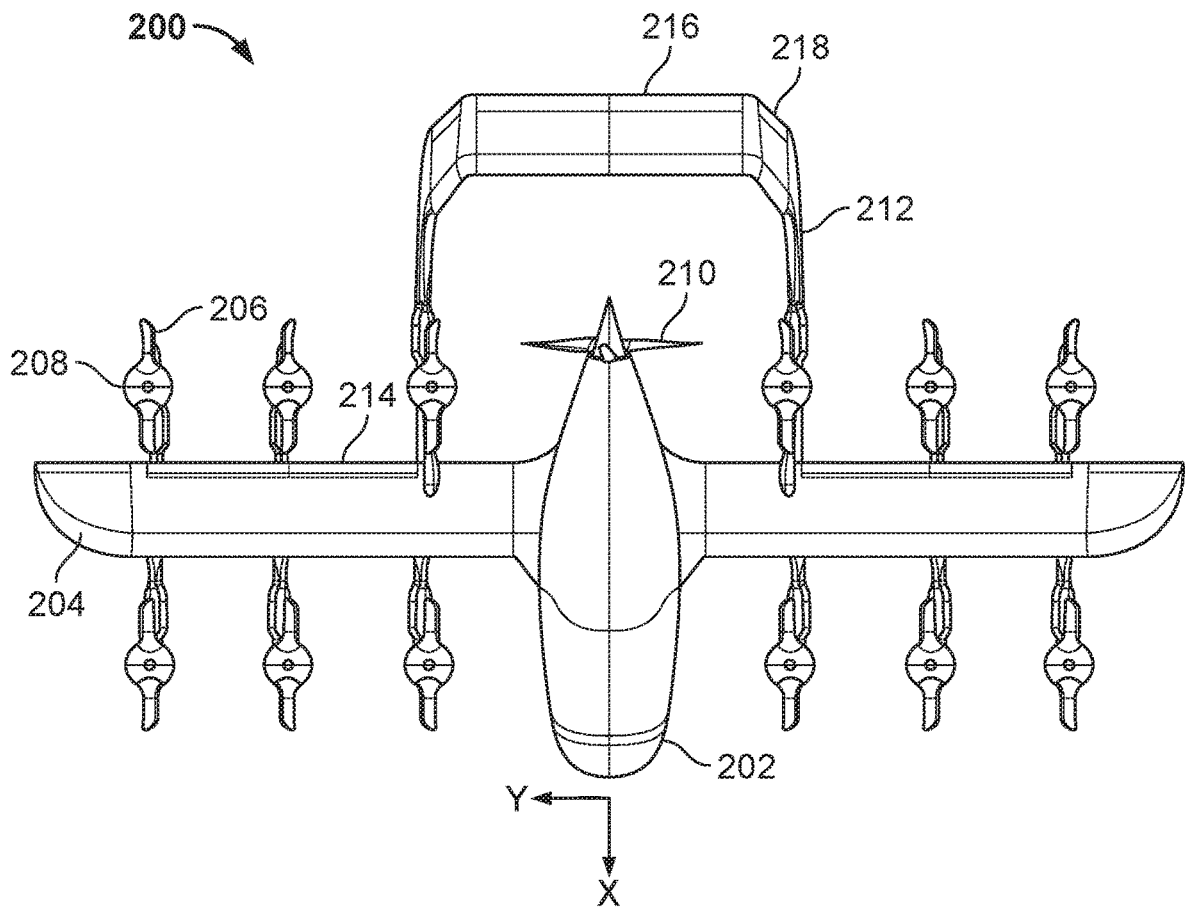
FIG. 2D is a block diagram illustrating a top view of an embodiment of a multicopter aircraft with angled rotors.

FIG. 2D is a block diagram illustrating a top view of an embodiment of a multicopter aircraft with angled rotors. Specifically, in FIG. 2D a top view off aircraft 200 of FIG. 2A is shown. Coordinate axes in the x (forward) and y (side) direction are indicated. In the example shown, the aircraft 200 includes twelve lift fans 208, six on either side of the fuselage 202. On each side of the fuselage 202, three lift fans are mounted forward of the wing 204 and three aft. The lift fans 208 are mounted in pairs on corresponding booms 206 mounted under the wings 204. The outermost booms are tilted away from the fuselage 202 and the middle and inner booms are tilted towards the fuselage, as shown in FIGS. 2B and 2C.

Figure 2E:
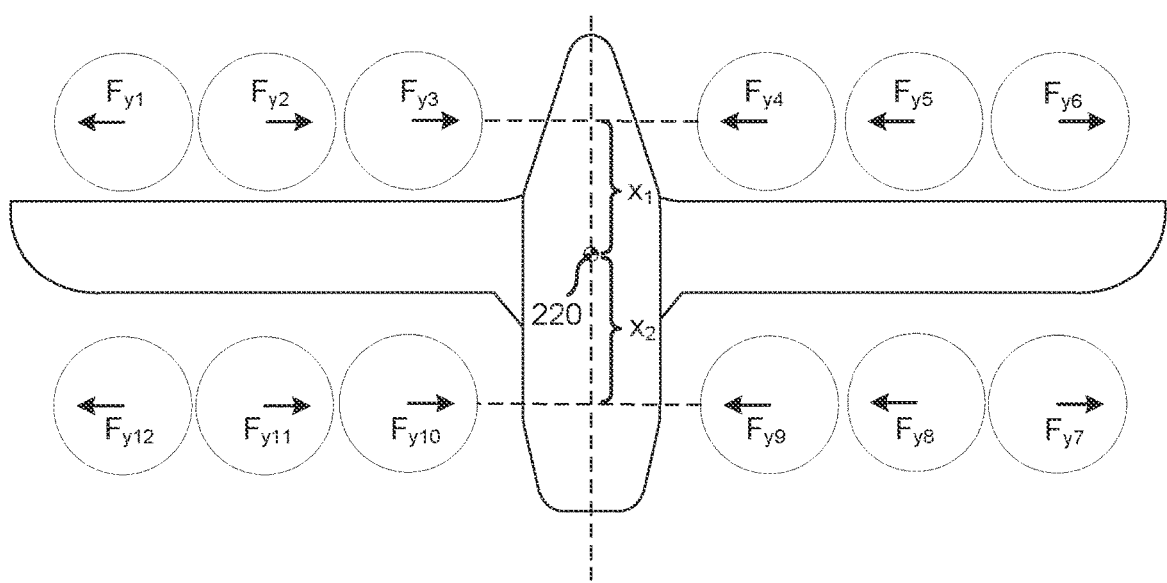
FIG. 2E is a block diagram illustrating an example of forces and moments capable of being generated by angled rotors in an embodiment of a multicopter aircraft with angled rotors.

FIG. 2E is a block diagram illustrating an example of forces and moments capable of being generated by angled rotors in an embodiment of a multicopter aircraft with angled rotors. In FIG. 2E, the fuselage 202 of the aircraft 200 of FIG. 2D is shown to have a center of gravity 220. The circles in FIG. 2E each represent a corresponding one of the lift fans 208. The arrows labeled $F_{y1}$, $F_{y2}$, etc. represent the respective lateral (y-axis) components of the force generated by the angled lift fans 208 by virtue of their being mounted at angles, and shown in FIGS. 2A-2D. The rear (aft) fans are shown to be mounted at an x-axis distance $x_1$ from center of gravity 220. As a result, the y-axis components of the rear lift fans, as shown, would result in corresponding moments of magnitudes proportional to the distance x1 being applied to the aircraft about the vertical axis (z-axis, using the convention shown in FIGS. 2A-2E). The moment contributed by any given one of the rear lift fans would be determined by the lift force generated by the lift fan as actuated by the flight control system, with the direction (counter-clockwise or clockwise) depending on the position of the lift fan and whether it was tilted away from or towards the fuselage 202. For example, the rear leftmost lift fan would contribute a lateral force $F_{y1}$ resulting in contributing a counter-clockwise moment component about the center of gravity 220. The right side (as shown in FIG. 2E) rear inner and middle lift fans ($F_{y4}$, $F_{y5}$) similarly would contribute a counter-clockwise moment component. By contrast, the lift fans associated with lateral force components $F_{y2}$, $F_{y3}$, and $F_{y6}$ would contribute clockwise moment components.

Similar to the rear lift fans, the forward lift fans (associated with lateral force components $F_{y7}$-$F_{y12}$, in this example) would contribute moment components proportional to the x-axis distance $x_2$ at which they are mounted relative to the center of gravity 220.

In various embodiments, the respective lift fans 208 may be rotated in alternating clockwise or counterclockwise rotations, e.g., to balance side forces associated with rotation direction. In the example shown in FIGS. 2A-2E, a total of twelve lift fans 208 are included. In various embodiments, an even number of lift fans including at least four lift fans may be included and distributed evenly on each side of the fuselage. Upon loss or failure of a lift fan, a corresponding lift fan on an opposite side of the aircraft may be deactivated, to maintain balance. For example, loss of a clockwise rotating lift fan on a forward end of an innermost boom on a port side of the aircraft may result in a counterclockwise rotating lift fan in a complementary position on the opposite side, such as the aft end of the innermost boom on the opposite side, may be shut down and omitted from use (e.g., zero RPM/torque added as a constraint for that lift fan) in subsequent optimization computations to determine mixes of actuators and associated parameters to achieve desired forces and moments.

Figure 2F:
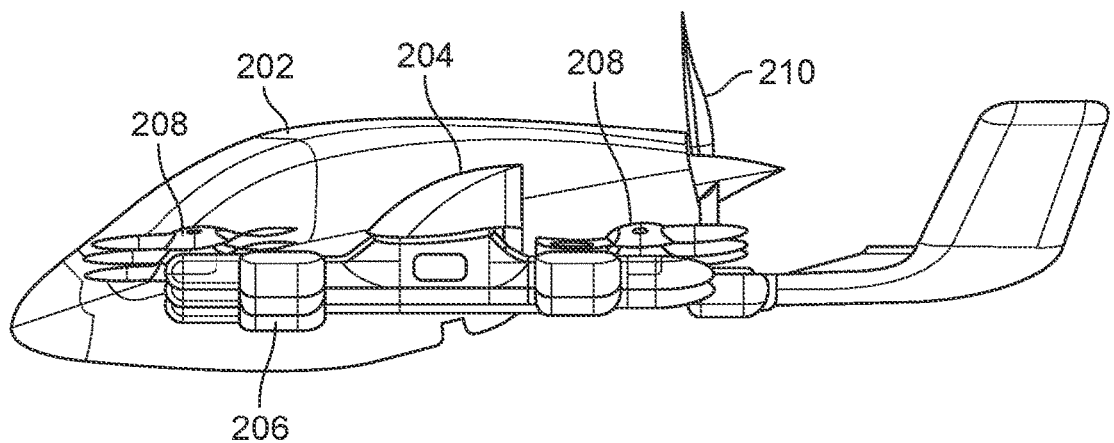
FIG. 2F is a block diagram showing a side view of the multicopter aircraft 200 of FIG. 2A.

FIG. 2F is a block diagram showing a side view of the multicopter aircraft 200 of FIG. 2A. In the example shown, the lift fans 208 are mounted at a prescribed forward tilt relative to a horizontal plane of the aircraft 200. The booms 206 are shown to be mounted substantially aligned with the horizontal plane of the aircraft 200 when in level flight. The wings 204 sweep up slightly as they extend away from the fuselage 202. In various embodiments, the angle at which the lift fans 208 are tilted forward may be determined at least in part on the same considerations as the angles illustrated in FIGS. 2B and 2C, i.e., to ensure that debris thrown centrifugally from a lift fan if it were to break apart would not intersect at least a human-occupied or otherwise critical portion of a cockpit or cabin portion of fuselage 202. In some embodiments, the angle at which the lift fans 208 are tilted forward may be selected at least in part to minimize drag, turbulence, or other undesirable aerodynamic effects of the lift fans when the aircraft 200 is in forward flight, e.g., being propelled by push propeller 210.

Figure 2G:
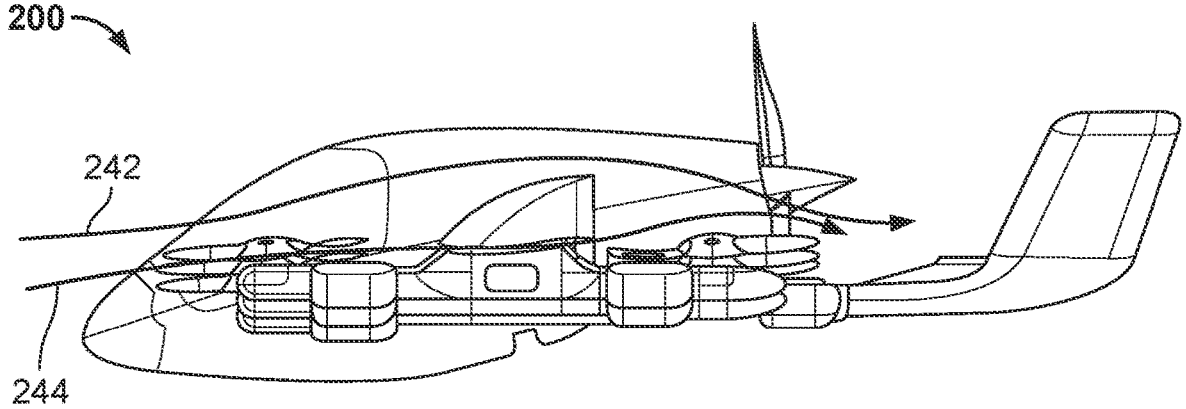
FIG. 2G is a block diagram showing a side view of the multicopter aircraft 200 of FIG. 2A.

FIG. 2G is a block diagram showing a side view of the multicopter aircraft 200 of FIG. 2A. In the example shown, approximate airflow patterns are illustrated by arrows 242 and 244. Arrow 242 shows air flowing with minimal resistance over the forward lift fans 208 and, due in part to the forward tilt of the forward lift fans 242, continuing relatively unimpeded over wing 204, and clearing the aft lift fans 208 (or, in some embodiments, flowing over them in a relatively low drag path, due in part to their forward tilt). Arrow 244 shows air flowing under/through the forward lift fans 208, under the wing 204, and flowing over the aft lift fans 208 in a relatively low drag manner, due at least in part to the forward tilt of the aft lift fans 208.

In some embodiments, the wing 204 may not sweep upward to the same extent as shown in FIGS. 2F and 2G, and in some such embodiments the aft lift fans may be more within a same horizontal plane as the forward lift fans 208 and wing 204. In some such embodiments, the aft lift fans 208 may be tilted back slightly, instead of forward, to provide a continuous, relatively low drag pathway for air to flow over the forward lift fans 208, the wing 204, and the after lift fans 208, e.g., when the aircraft 200 is in forward flight mode.

In various embodiments, a flight control system, such as flight control system 100 of FIG. 1, is configured to determine a mix of actuators and corresponding actuator parameters, including of lift fans 208, to achieve required forces and moments, including by taking into consideration the moments about the z-axis that would be generated and applied to the aircraft 200 by virtue of the lift fans being mounted at angles, as disclosed herein.

In various embodiments, techniques disclosed herein may be used to provide a multicopter aircraft having angled lift fans and/or rotors. Each rotor may be mounted at an angle such that debris thrown centrifugally from the lift fan, in a plane of rotation of the lift fan, would not intersect the fuselage or other critical structure of the aircraft. In various embodiments, angling rotors as disclosed herein may provide a degree of authority over (ability to control or influence) yaw of the aircraft, e.g., during hover or vertical takeoff (lift) or landing operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft comprising:
   a fuselage; and
   a plurality of booms coupled to a wing on each side of the fuselage; and
   a plurality of lift rotors disposed on the plurality of booms;
   wherein each lift rotor is oriented at a corresponding non-zero angle to a substantially horizontal plane of the aircraft, wherein during forward flight, each lift rotor is stopped and aligned to a local flow angle and aligned with the corresponding boom.

2. The aircraft of claim 1, wherein at least a portion of the plurality of lift rotors are provided at a fixed position on the plurality of booms.

3. The aircraft of claim 1, wherein each of the plurality of lift rotors is provided at a fixed position on the plurality of booms.

4. The aircraft of claim 1, wherein an outermost pair of lift rotors on each side of the fuselage is oriented at the non-zero angle relative to the substantially horizontal plane of the aircraft such that the outermost pair of lift rotors is tilted outboard away from the fuselage.

5. The aircraft of claim 1, wherein at least two pairs of lift rotors on each side of the fuselage is oriented at the non-zero angle relative to the substantially horizontal plane of the aircraft such that the two pairs of lift rotors are tilted in a same direction with respect to the fuselage.

6. The aircraft of claim 1, further comprising:
   a human occupied portion provided in a forward part of the fuselage.

7. The aircraft of claim 1, wherein the plurality of lift rotors comprises:
   a first plurality of lift rotors, each rotor in the first plurality of lift rotors being mounted on a forward end of a corresponding one of said the plurality of booms; and
   a second plurality of lift rotors, each rotor in the second plurality of lift rotors being mounted on an aft end of the corresponding one of said the plurality of booms,
   wherein each rotor in the first plurality of lift rotors and each rotor in the second plurality of lift rotors produces an amount of vertical thrust independent of levels of vertical thrust produced by other lift rotors.

8. The aircraft of claim 1, wherein the plurality of lift rotors comprises a forward subset that includes one or more of the plurality of lift rotors that are mounted forward of a center of gravity of the aircraft and an aft subset that includes one or more of the plurality of lift rotors that are mounted aft of the center of gravity of the aircraft.

9. The aircraft of claim 8, wherein the aft subset of lift rotors are coupled to the plurality of booms with a forward tilt.

10. The aircraft of claim 8, wherein the aft subset of lift rotors are coupled to the plurality of booms with a backward tilt.

11. The aircraft of claim 1, wherein a respective plane of rotation of each one of the plurality of lift rotors do not intersect the fuselage.

12. The aircraft of claim 1, wherein the plurality of lift rotors are driven by electric motors.

13. The aircraft of claim 1, further comprising one or more batteries to drive the plurality of lift rotors.

14. The aircraft of claim 1, wherein the aircraft is configured to perform a hover operation, a vertical takeoff operation and a vertical landing operation.

15. The aircraft of claim 1, wherein the non-zero angle is determined to align each lift rotor to the local flow angle during the forward flight when the lift rotor is stopped and aligned with the corresponding boom.

16. The aircraft of claim 1, wherein each boom is positioned at an angle relative to a vertical axis of the aircraft.

17. The aircraft of claim 1, wherein the plurality of lift rotors comprises one or more lift rotors mounted aft of the center of gravity of the aircraft that are coupled to the plurality of booms with a forward tilt or a backward tilt.

* * * * *